(12) United States Patent
Sharma et al.

(10) Patent No.: US 6,327,646 B1
(45) Date of Patent: *Dec. 4, 2001

(54) TRANSLATION LOOK-ASIDE BUFFER UTILIZING HIGH-ORDER BITS FOR FAST ACCESS

(75) Inventors: Vinod Sharma, San Jose; Bharat Bhushan, Cupertino, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,336

(22) Filed: Mar. 12, 1999

(51) Int. Cl.[7] .................................................. G06F 12/10
(52) U.S. Cl. ........................ 711/207; 711/108; 711/205; 365/189.07; 365/49
(58) Field of Search .................................. 711/207, 108, 711/205, 202, 204, 206, 213, 221; 365/49, 189.07; 707/6

(56) References Cited

U.S. PATENT DOCUMENTS

| | | | |
|---|---|---|---|
| 5,133,058 | * | 7/1992 | Jensen ................................... 711/207 |
| 5,222,222 | * | 6/1993 | Mehring et al. ...................... 711/207 |
| 5,325,507 | * | 6/1994 | Freitas et al. .......................... 365/49 |
| 5,491,806 | * | 2/1996 | Horstmann et al. ................. 711/207 |
| 5,659,697 | * | 8/1997 | Dietz ................................... 711/207 |
| 5,805,490 | * | 9/1998 | Machida .............................. 708/700 |

OTHER PUBLICATIONS

Jordi Cortadella and Jose M. Liaberia, "Evaluation of A +B =K Conditions Without Carry Propagation", IEEE Transaction on Computers, vol. 41, No. 11, Nov. 1992, pp. 1484–1487.

* cited by examiner

*Primary Examiner*—B. James Peikari
(74) *Attorney, Agent, or Firm*—Seth Kalson

(57) ABSTRACT

A fast translation look-aside buffer for translating a linear address $R_L=A+B$ to a physical address, where A and B are two N bit operands. Inputs to the translation look-aside buffer are the n highest-order bits of A and B, where n<N, and the carry-out term from the sum of the first N−n bits of A and B. The TLB may provide a hit without the need for the sum of A and B.

16 Claims, 8 Drawing Sheets

TRANSLATION LOOK-ASIDE BUFFER UTILIZING HIGH-ORDER BITS FOR FAST ACCESS

FIELD

The present invention relates to computer memory caches, and more particularly, to translation look aside buffers and content addressable memories.

BACKGROUND

Most microprocessors make use of virtual or demand-paged memory schemes, where sections of a program's execution environment are mapped into physical memory as needed. Virtual memory schemes allow the use of physical memory much smaller in size than the linear address space of the microprocessor, and also provide a mechanism for memory protection so that multiple tasks (programs) sharing the same physical memory do not adversely interfere with each other.

A virtual or demand-paged memory system may be illustrated as a mapping between a linear (virtual) address space and a physical address space, as shown in FIG. 1. The linear address space is the set of all linear (virtual) addresses generated by a microprocessor. The physical address space is the set of all physical addresses, where a physical address is the address provided on a memory bus to write to or read from a physical memory location. For a 32 bit machine, the linear and physical address spaces are $2^{32}$~4 GBytes in size.

In a virtual memory system, the linear and physical address spaces are divided into blocks of contiguous addresses, so that linear and physical addresses belong to at most one block. These blocks are customarily referred to as pages if they are of constant size or are any of several fixed sizes, whereas variable sized blocks are customarily referred to as segments. The linear address space may divided into both segments and pages. A typical page size may be 4 KBytes, for example.

The mapping shown in FIG. 1 illustrates a two-level hierarchical mapping comprising directory tables and page tables. Page directory tables and page tables are stored in physical memory, and are usually themselves equal in size to a page. A page directory table entry (PDE) points to a page table in physical memory, and a page table entry (PTE) points to a page in physical memory. For the two-level hierarchical mapping of FIG. 1, a linear address comprises directory field 102, table field 104, and offset field 106. A directory field is an offset to an PDE, a table field is an offset to an PTE, and an offset field is an offset to a memory location in a page.

In FIG. 1, page directory base register (PDBR) 108 points to the base address of page directory 110, and the value stored in directory field 102 is added to the value stored in PDBR 108 to provide the physical address of PDE 112 in page directory 110. PDE 112 in turn points to the base address of page table 114, which is added to the value stored in table field 104 to point to PTE 116 in page table 114. PTE 116 points to the base address of page 118, and this page base address is added to the value stored in offset 106 to provide physical address 120. Linear address 122 is thereby mapped to physical address 120.

Accessing entries stored in page directories and page tables require memory bus transactions, which can be costly in terms of processor cycle time. However, because of the principle of locality, the number of memory bus transactions may be reduced by storing recent mappings between linear and physical addresses in a cache, called a translation look-aside buffer (TLB). There may be separate TLBs for instruction addresses and data addresses.

Shown in FIG. 2 is an example of an TLB with an associated data or instruction cache comprising way 202 and directory 204. (For simplicity, only one way and one directory of the cache is shown in FIG. 2, but the cache may have m ways and directories so as to be m-way set associative.) The entries (lines) in a way contain data or instructions retrieved from another higher level of the memory hierarchy (not shown). Associated with each entry in way 202 is an entry in directory 204.

In describing the indexing of the TLB, the information content of the entries in the ways and directories of a cache unit, and how these indices and entries relate to linear and physical addresses, it is convenient to introduce the following notation. We denote an arbitrary linear address by $A_L$ and an arbitrary physical address by $A_p$. If a linear address $A_L$ maps into a physical address $A_p$, we write $A_L \leftarrow\rightarrow A_p$ (this mapping is one-to-one). When convenient, other capital letters will be used to denote other addresses (or portions thereof), e.g., $B_p$ for a physical address, etc. The highest-order n bits of any tuple A (which may be an address) will be denoted by $[A]_n$.

Entries in an TLB and entries in a cache directory are indexed (or pointed to) by various subsets of a linear address. To describe this in more detail, it is useful to partition $A_L$ as $A_L = [A''_L A'_L]$ where $A''_L$ points to a unique entry in the TLB and $A'_L$ points to a unique entry in a cache directory. Provided there is an TLB hit, the TLB provides a translation of $A''_L$ to the physical address space, and the cache directory entry pointed to by $A'_L$ provides the physical address of its associated cache way entry. If the cache way entry is valid, and if the physical address translation provided by the TLB matches the physical address provided by the cache directory entry, then there is a cache hit and the desired object is retrieved from the cache way. If the comparison between the physical addresses fails, then there is a cache miss and another part of the memory hierarchy (not shown) may need to be accessed. If there is an TLB miss, then the memory hierarchy is accessed to provide the proper page directory and page table entries.

The above process can be described in more detail as follows. Depending upon how $A_L$ is partitioned, not all of the bits in $A''_L$ are needed to point to an entry in the TLB. For example, $A_L$ may be partitioned so that part of $A''_L$ includes a portion of the offset field. No translation is required for the offset field, and therefore that portion of $A''_L$ containing a portion of the offset field does not need translation by the TLB. Consequently, there may be n highest-order bits of $A_L$, denoted as $[A_L]_n$, that are used to point to entries in the TLB where n is less than the number of bits in $A''_L$. (Note that in this case $[A_L]_n = [A''_L]_n$.)

If there is an TLB hit (i.e., a tag matches $[A_L]_n$, and the entry associated with the tag is valid), then the TLB provides the physical translation of $[A_L]_n$, which when appended (concatenated) with those bits of $A''_L$ not in $[A_L]_n$, (if any) provides the physical translation of $A''_L$. Denoting the physical translation of $A''_L$ as $A''_p$, we have $A_L \leftarrow\rightarrow [A''_p A'_L]$.

For the particular example in FIG. 2, $A''_L$ is the concatenation of page directory field 102 and page table field 104, so that entries in TLB 214 are pointed to by values in the page directory and page table fields of a linear address. For FIG. 2, the bits stored in offset field 106 point to a unique entry in directory 204 and way 206. That is, $A'_L$ would be identified with offset field 106. The result of an TLB hit would then be the "upper portion" of the physical address mapped by the linear address, i.e., $A''_P$, and the "lower portion" of the physical address is simply the value stored in offset field 106, i.e., $A'_L$.

A cache hit can now be summarized as follows. For some linear address $A_L=[A''_L A'_L]$, the tags in the TLB are compared with $[A_L]_n=[A_{L''L}]_n$. If there is a hit, and if the entry associated with the matched tag is valid, then the TLB entry provides the physical translation of $[A_L]_n$, which when appended to those bits of $A''_L$ not in $[A''_L]_n$ provides $A''_P$, where $A_L \leftarrow \rightarrow [A''_P A'_L]$. Tags in the cache directories are compared with $A'_L$. If there is a hit for a tag, and the entry associated with the tag is valid, then the entry in the cache directory provides $B''_P$ where $B_P=[B''_P A'_L]$ is the physical address of the object stored in the corresponding cache way entry. (Entries in the directories alsoe comprise other information concerning lines in the ways, e.g., whether the line is dirty, valid, shared with other caches, etc.) If $B''_P$ matches $A''_P$, then $A_L \leftarrow \rightarrow B_P$ and there is a cache hit. If $B''_P$ fails to match $A''_P$, then there is a cache miss.

The structure of an TLB is illustrated in FIG. 3, comprising CAM (Content Addressable Memory) 302 and RAM (Random Access Memory) 304. A portion of a linear address (more precisely $[A''_L]_n$) is provided to CAM 302, and a hit provides a signal on one of word lines 306 so that RAM 304 provides the result $[A''_P]_n$.

FIG. 4 illustrates part of CAM 302. For simplicity, only the first three TLB tags are shown stored in registers 402, 404, and 406. A portion of linear address 408, $[A''_L]_n$, (e.g., the page directory and page table fields for the two-level hierarchical mapping scheme of FIGS. 1 and 2) is compared with each tag stored in the CAM, and if there is a hit, one of the word lines is brought HIGH.

Often, the linear address of an object in memory is expressed as the sum of two operands. For example, if a branch instruction provides a relative target linear address, then the target linear address is the sum of the relative target linear address and the instruction pointer. If this branch instruction is predicted as taken, then the target instruction having the target linear address is fetched from the instruction cache (or another level of memory in the memory hierarchy if there is an instruction cache miss). Such examples are not only limited to instructions.

Computing the sum of two operands to obtain a linear address before accessing a translation look-aside buffer adds to the overall latency in providing the physical address to which the linear address is mapped to. The present invention addresses this problem.

SUMMARY

The present invention is directed to an apparatus and method for providing the physical address associated with a linear address, where the linear address is the sum of two operands, without necessarily computing the sum of the operands. Some embodiments of the present invention are directed to content addressable memories, and translation look-aside buffers comprising such content addressable memories, in which an indication is provided as to whether n bits of the sum of two operands match a stored tag.

One particular embodiment of the present invention is directed to a translation look-aside buffer having a first input port to receive a signal indicative of $[A]_n=(a_n, a_{n-1}, \ldots, a_1)$, where ($a_n, a_{n-1}, \ldots, a_1$) are the n highest-order bits of an operand A having N bits where n<N; a second input port to receive a signal indicative of $[B]_n=(b_n, b_{n-1}, \ldots, b_1)$, where ($b_n, b_{n-1}, \ldots, b_1$) are the n highest-order bits of an operand B having N bits; memory cells to store a tag $k_n=(k_n, k_{n-1}, \ldots, k_1)$; and a fast adder-comparator to provide a word line signal indicative of whether $[A+B]_n=k_n$, where $[A+B]_n=(r_n, r_{n-1}, \ldots, r_1)$, where $(r_n, r_{n-1}, \ldots, r_1)$ are the n highest-order bits of (A+B).

DETAILED DESCRIPTION OF THE EMBODIMENTS

Figure 1:
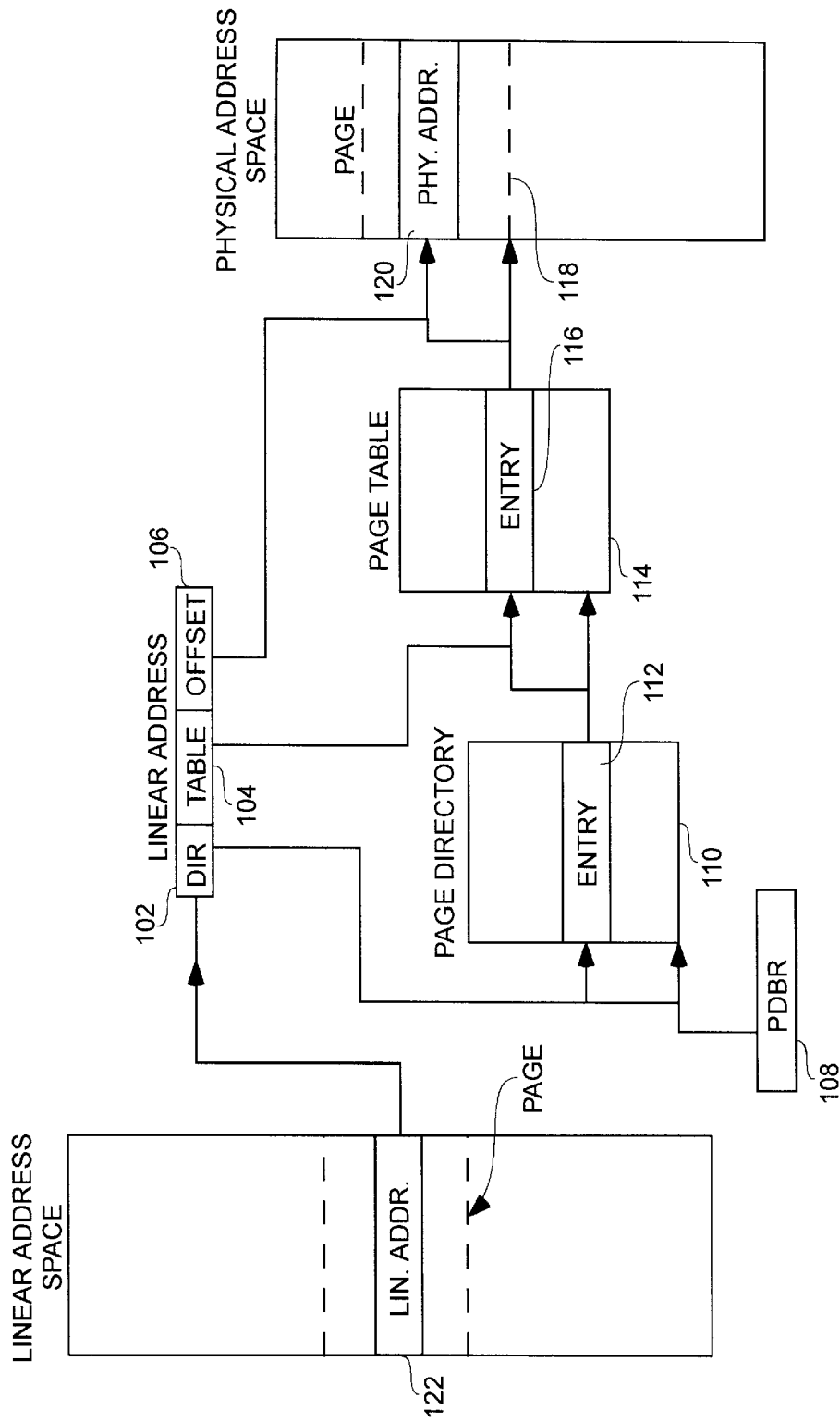
FIG. 1 illustrates a prior art two-level hierarchical virtual memory scheme for mapping linear addresses to physical addresses.
Figure 2:
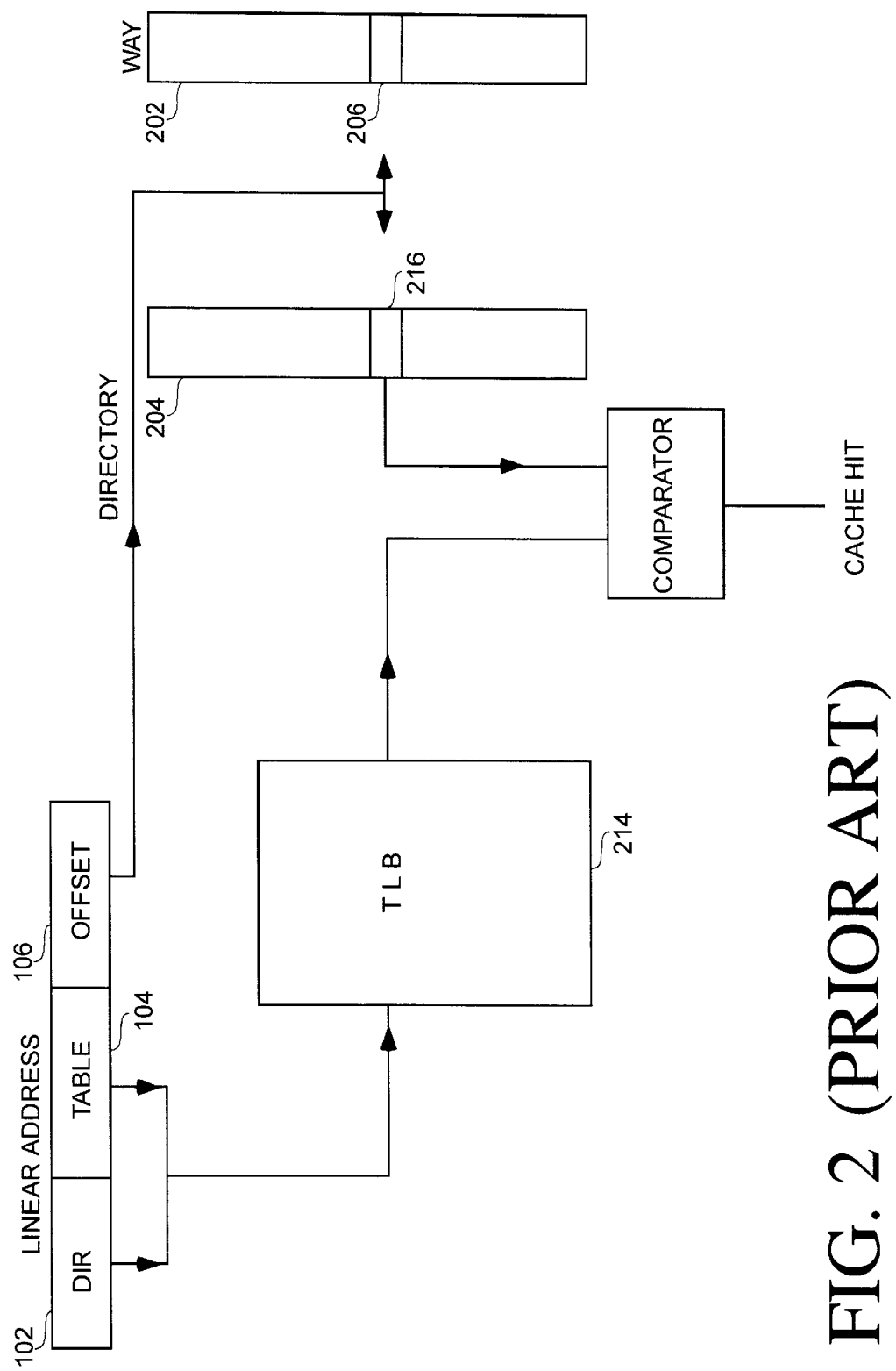
FIG. 2 illustrates a prior art translation look-aside buffer with a cache.
Figure 3:
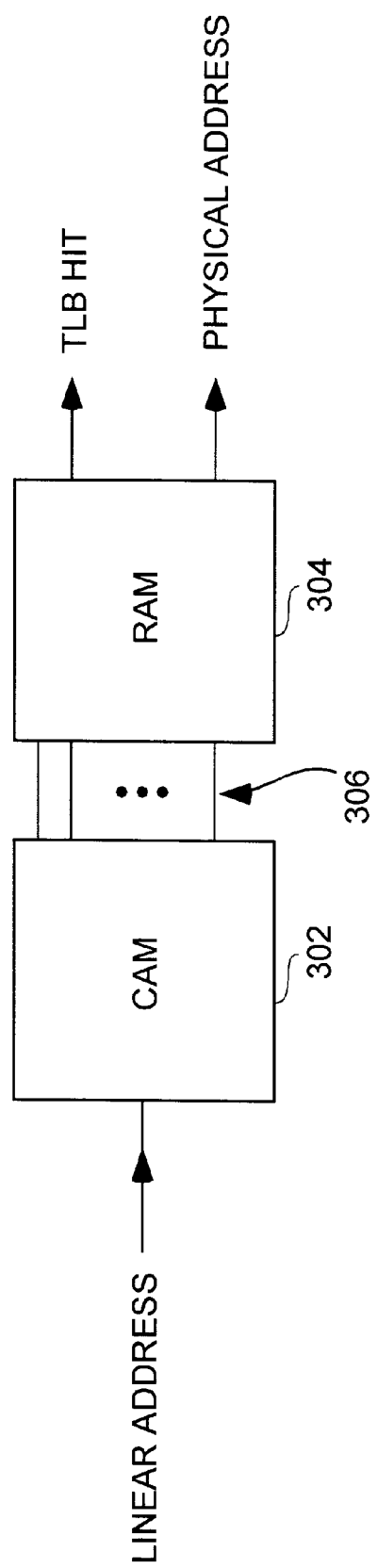
FIG. 3 illustrates the structure of a prior art translation look-aside buffer.
Figure 4:
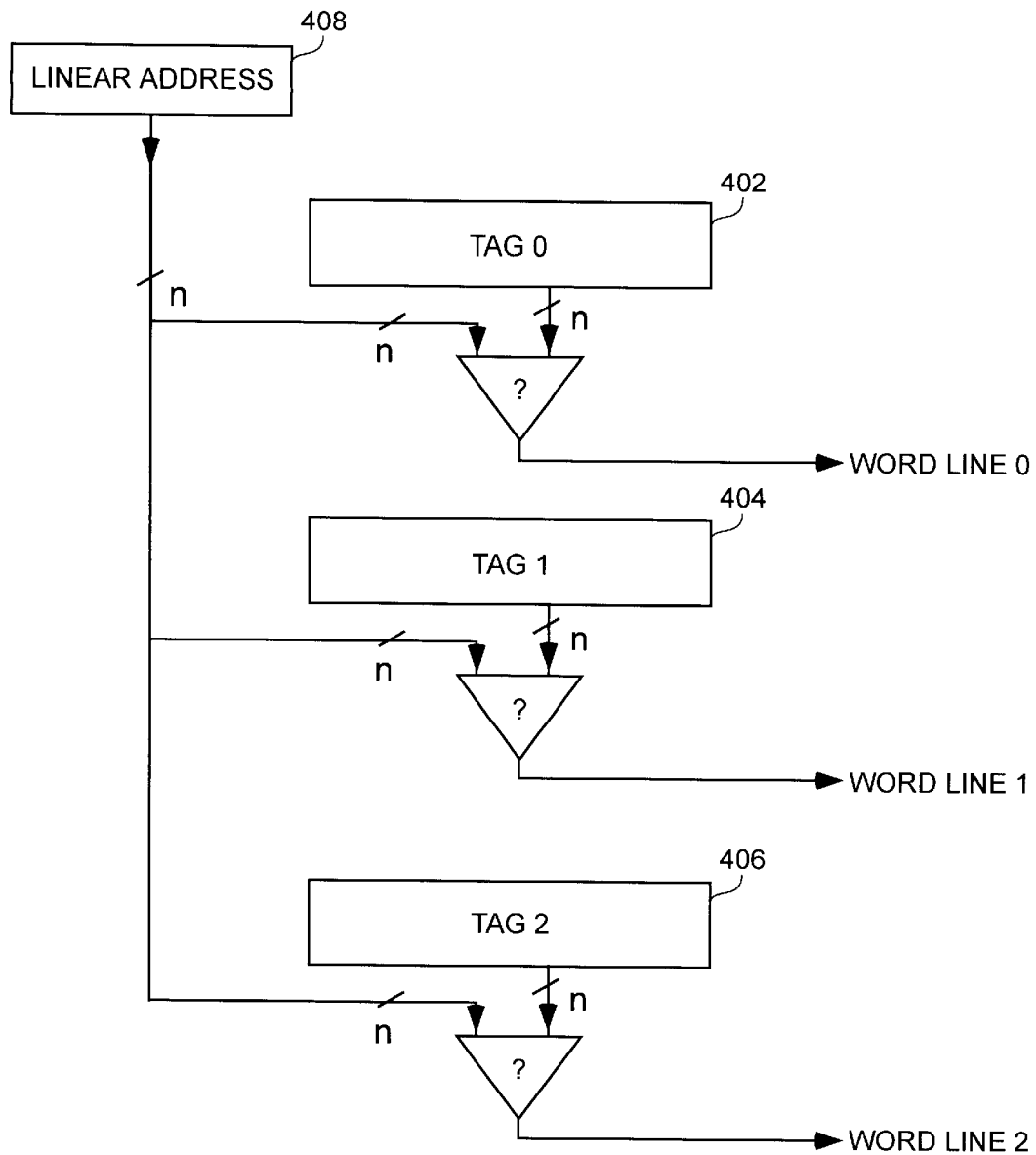
FIG. 4 illustrates the content addressable memory portion of a prior art translation look-aside buffer.

Consider two operands A and B for which it is desired to retrieve an object from a cache unit having a linear address $R_L=A+B$. (A and B are not necessarily addresses, but arbitrary operands, and the addition may be performed in any type of computer arithmetic, such as two's complement arithmetic.) Embodiments of the present invention provide for an TLB having inputs that are the n highest-order bits of A and B, denoted by $[A]_n$ and $[B]_n$, respectively, such that the TLB may provide a hit without the need for the sum of A and B. If there is a valid entry in the TLB with a tag matching $[R_L]_n=[A+B]_n$ (e.g., the page directory and page table fields of $R_L$), then the desired object may be retrieved from the cache unit without the need for performing the sum. (The linear address may nevertheless need to be calculated from the operands, e.g., to update architectural registers, or to provide the current instruction pointer if the retrieved object is the target instruction of a branch. However, the TLB is accessed before this sum is completed, thereby speeding up cache hits.)

It will be shown that a non-recursive procedure may be implemented for determining whether $[A+B]_n$ matches a tag in the TLB. This non-recursive procedure is applied to each of the n highest order bits of A and B, as well as the tag under test. The procedure is non-recursive in the sense that bitwise comparisons are made among propagator terms, the tag under test, and another set of terms which will be referred to as conditional carry-out terms. Because the procedure is non-recursive, the bit-wise comparisons may be done in parallel, thereby speeding up the TLB hit time.

To this end, let $[R_L]_n \equiv (r_n, r_{n-1}, \ldots, r_1)$ denote the highest-order n bits of an address $R_L$ by which the TLB is indexed. Let $[A]_n \equiv (a_n, a_{n-1}, \ldots, a_1)$ and $[B]_n \equiv (b_n, b_{n-1}, \ldots, b_1)$. Let a tag in the CAM portion of a TLB be denoted by the n-bit vector $K_n \equiv (k_n, k_{n-1}, \ldots, k_1)$. There is an TLB hit for this tag if its associated TLB entry is valid and each bit of $[R_L]_n$ matches each corresponding bit of $K_n$. Or equivalently, defining $e_i \equiv \overline{r_i \oplus k_i}$ where the bar over a Boolean variable indicates Boolean complement and $\oplus$ denotes exclusive OR, and defining $E_n \equiv e_n \wedge e_{n-1} \wedge \cdots \wedge e_1$ where $\wedge$ denotes logical AND, there is an TBL hit for this tag if its associated entry is valid and $E_n=1$. If $E_n=0$, there is no hit for this tag. ("1" and "0" in this context are Boolean elements.)

The following observation leads to the design of an TLB without the need for calculating the sum of the operands. The carry-out term $c_i$ for the $i^{th}$ bit position in the sum of $[A]_n$ and $[B]_n$ can be expressed as $c_i=(p_i \wedge \overline{r_1}) \vee g_i$ where $\vee$ denotes logical OR and $p_i \equiv a_i \oplus b_i$ and $g_i \equiv a_i \wedge b_i$. Note that this expression for $C_i$ does not depend upon the carry-in term to the $i^{th}$ bit position (i.e., the carry-out term of the $(i-1)^{th}$ bit position). In terms of this carry-out term, the $(i+1)^{th}$ bit of the sum of $[A]_n$ and $[B_n]$ is $r_{i+1}=c_i \oplus p_{i+1}$, and consequently $e_{i+1}=\overline{c_i \oplus p_{i-1} \oplus k_{i+1}}$.

Now, define the conditional carry-out term $\upsilon_i \equiv (p_i \wedge \overline{k_i}) \vee g_i$, $i=1 \ldots n$. Note that $\upsilon_i$ would be the carry-out term $c_i$ if there was an TLB tag match in the $i^{th}$ bit position, that is, if $r_i=k_i$. Define $z_{i+1} \equiv \overline{\upsilon_i \oplus p_{i+1} \oplus k_{i+1}}$, $i=1 \ldots n-1$. Note that $z_{i+1}=e_{i+1}$ if $r_i=k_i$. Therefore, if $r_i=k_i$, then $z_{i+1}=1$ if and only if there is an TLB tag match in the $(i+1)^{th}$ position, that is, if $r_{i+1}=k_{i+1}$. It therefore follows that $z_{i+1} \wedge e_i = e_{i+1} \wedge e_i$ for the following reason. If $r_i=k_i$, then because $e_i=1$ and $z_{+1}=e_{i+1}$, we have $z_{i+1} \wedge e_i=1$ if and only if $r_{i+1}=k_{i+1}$. However, if $r_i \neq k_i$, then because $e_i=0$ we have $z_{i+1} \wedge e_i=0$ regardless of the value of $z_{i+1}$. Consequently, $z_{i+1} \wedge e_i = e_{i+1} \wedge e_i$. By induction, the following result holds:

$$z_n \wedge z_{n-1} \wedge \cdots \wedge z_2 \wedge e_1 = e_n \wedge e_{n-1} \wedge \cdots \wedge e_1 = E_n.$$

The above result can be re-written by defining $\upsilon_0 \equiv c_0$ as the carry-in term to the first bit position of the sum of $[A]_n$ and $[B_n]$ and defining $z_1 \equiv \overline{\upsilon_0 \oplus p_1 \oplus K_1}$. Note that $c_0$ is the carry-out term from the sum of the first N−n bits of the operands A and B where N is the number of bits in A and B. Because $r_1=c_0 \oplus p_1$ we have $z_1=\overline{r_1 \oplus k_1}=e_1$, and the above displayed result can be written as:

$$Z_n = E_n, \text{ where } Z_n \equiv z_n \wedge z_{n-1} \wedge \cdots \wedge z_1.$$

For the special case in which n=N, we have $\upsilon_0=0$, and the above relationship reduces to a theorem given in "Evaluation of A+B=K Conditions Without Carry Propagation," Jordi Cortadella and Jose M. Llaberia, *IEEE Transaction on Computers*, vol. 41, no. 11, November 1992, pages 1484–1487. However, since n≠N for an TLB, the theorem of Cortadella and Llaberia as stated in ibid. cannot be used because we need to compare $[A+B]_n$, rather than the sum A+B. with tags in the TLB.

Using the results derived herein, it is seen that an TBL hit can be determined based upon determination of $Z_n$. Calculating $z_i$ for i=2...n it can be performed in parallel since its definition is not recursive. However, to determine $z_1$, $c_0$ is needed, which may be determined by a carry-out generation circuit operating on the first N−n bits of A and B. Such circuits are well-known, and at most involve calculating the summation of the first N−n bits of A and B. Once $c_0$ is calculated, $z_1$ and consequently $Z_n$ can be determined. Because it takes less time to determine the carry-in term $c_0$ than the sum of A and B, there may still be a significant savings in hit time for a cache when compared to prior methods of computing the sum of A and B before accessing the cache.

Another approach is to conditionally calculate $z_1$ for both possible values of the carry-in term, and then choose the correct value of $z_1$ once the carry-in term has been evaluated. This would lead to in increase in cache hit speed for a slight expense in more chip area. Clearly, more tradeoffs between speed and chip area may be considered. For example, another approach is to conditionally calculate $Z_n$ for both possible values of the carry-in term, and then choose the correct value when the carry-in term is known.

Figure 5:
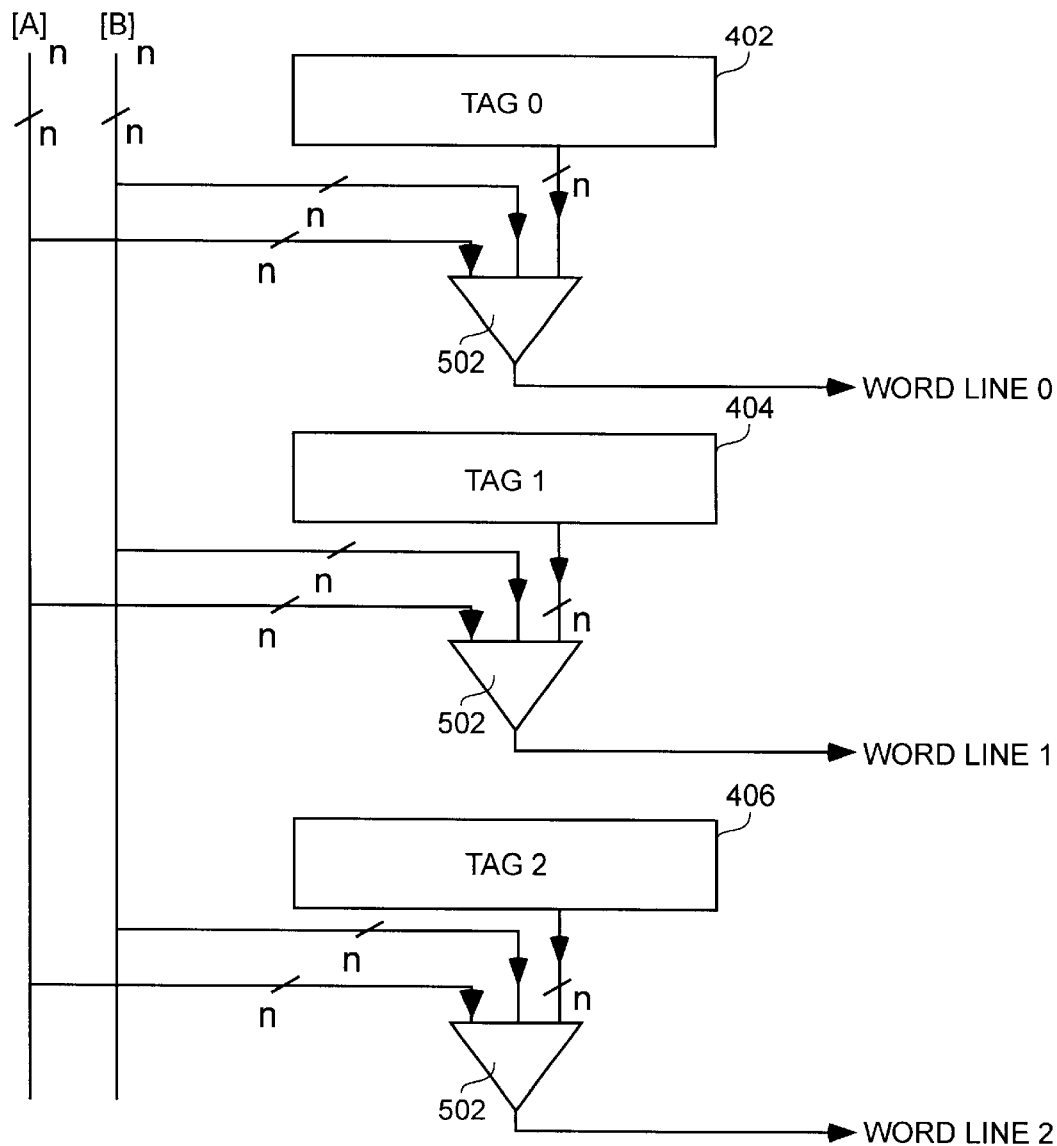
FIG. 5 illustrates the content addressable memory portion of a translation look-aside buffer according an embodiment of the present invention.

An embodiment of an TLB according to the present invention is illustrated in FIG. 5, where for simplicity only the CAM portion with elements corresponding to the first three word lines are shown. The inputs are $[A]_n$ and $[B]_n$. FACs (Fast Adder-Comparators) 502 generate signals indicative of $z_i$ for each of the various tags stored in the TLB. A signal indicative of $Z_n$ (or equivalently $E_n$ by the above theorem) is generated from the signals indicative of $z_i$, which may be generated by FACs 502.

Figure 6:
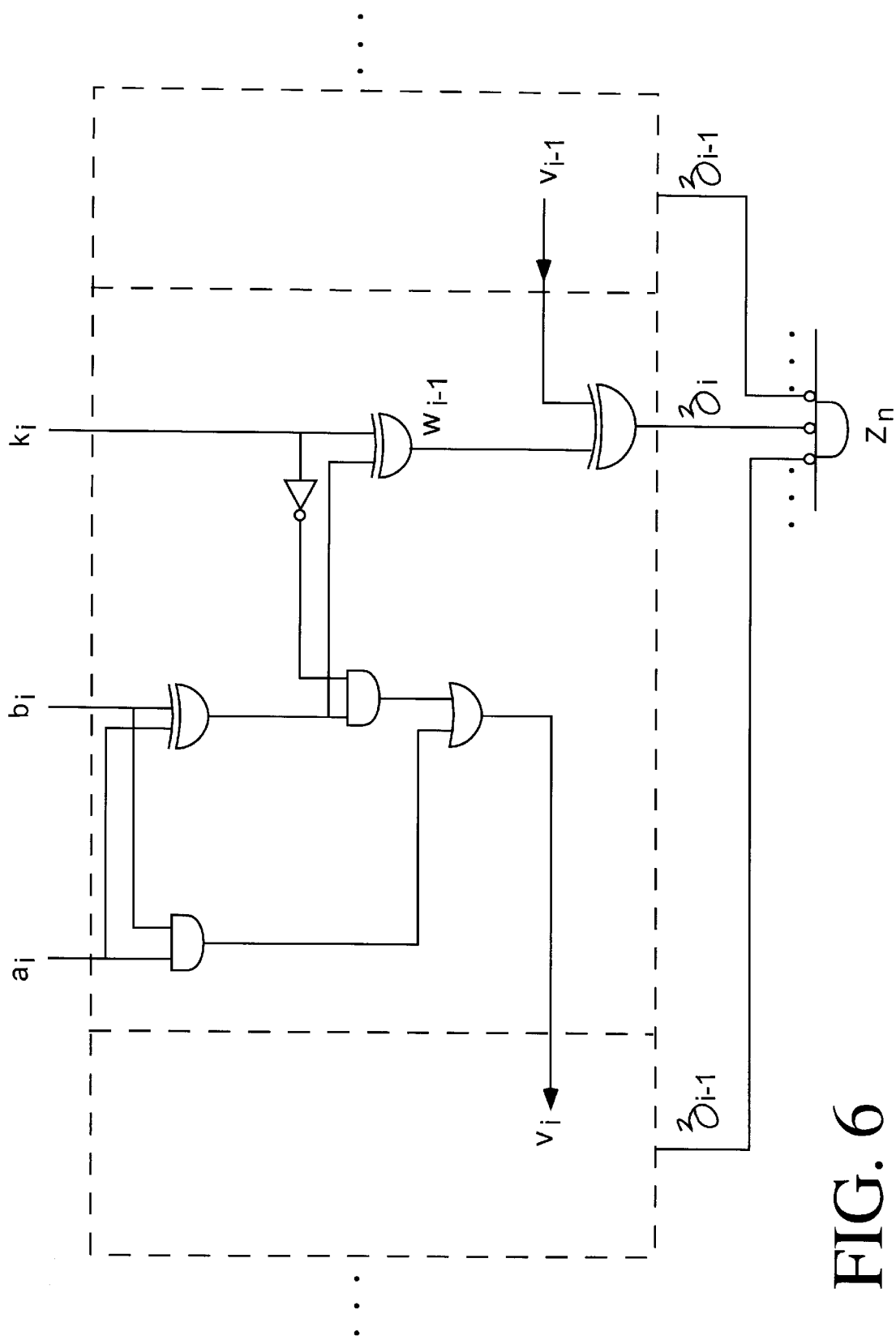
FIG. 6 illustrates a fast adder-comparator according to an embodiment of the present invention.
Figure 7:
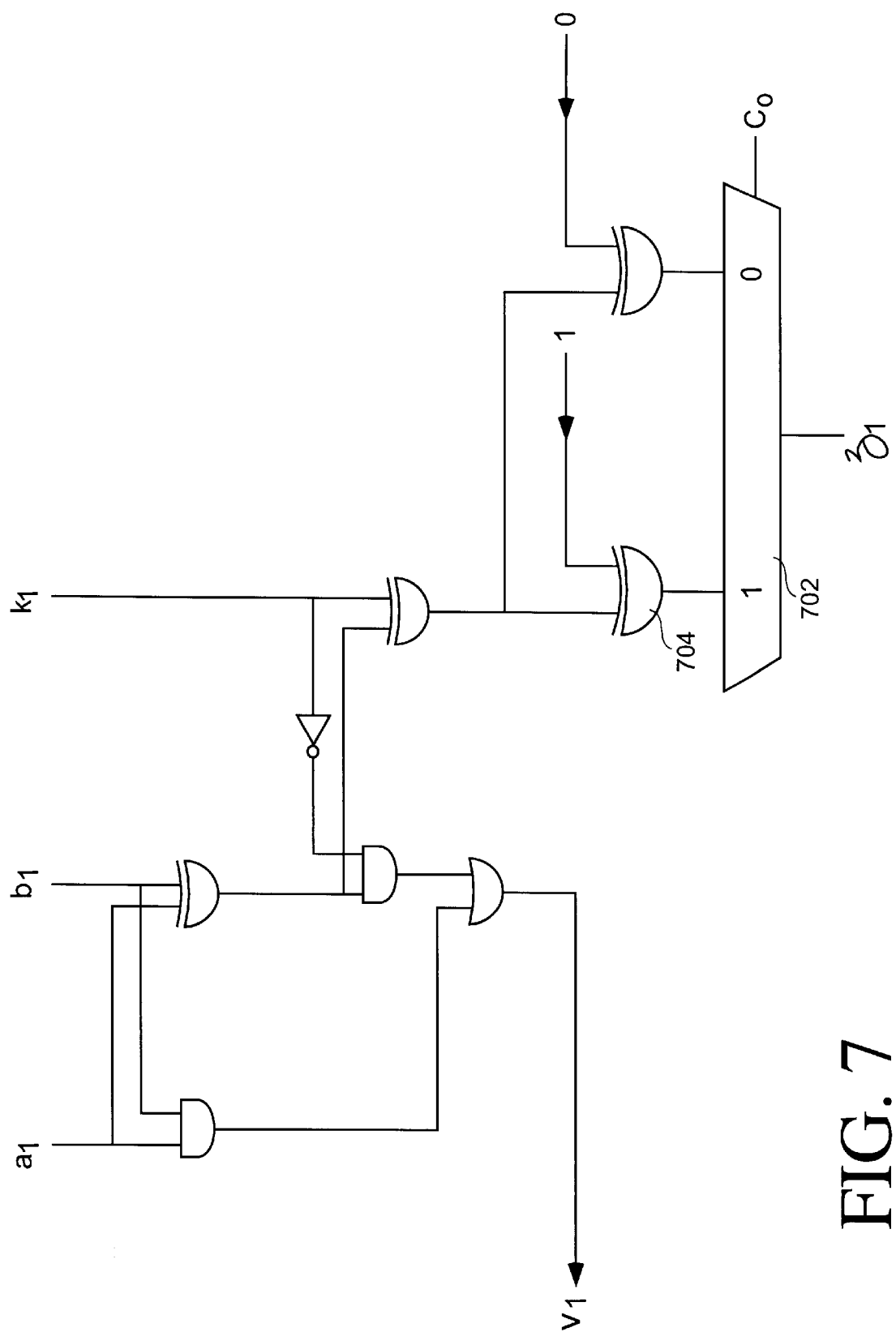
FIG. 7 illustrates an embodiment of the first stage of the fast adder-comparator of FIG. 6.

An embodiment of an FAC is illustrated in FIG. 6, where only an $i^{th}$ stage for i>2 is shown explicitly. The first stage of an exemplary embodiment FAC according to the present invention is shown in FIG. 7. In FIG. 7, multiplexer 702 sets $z_1$ equal to the output of XOR gate 704 if carry-out term $C_0=1$ and sets $z_1$ equal to the output of XOR gate 706 if carry-out term $C_0=0$.

If the linear address is known, i.e., no sum is required, then it may be provided as one of the operands with the other operand set to zero and the carry-out term set to zero. Alternatively, if the linear address is known, the CAM may include additional circuits for bypassing FACs 502 and performing a conventional comparison with the stored tags in the CAM.

Figure 8:
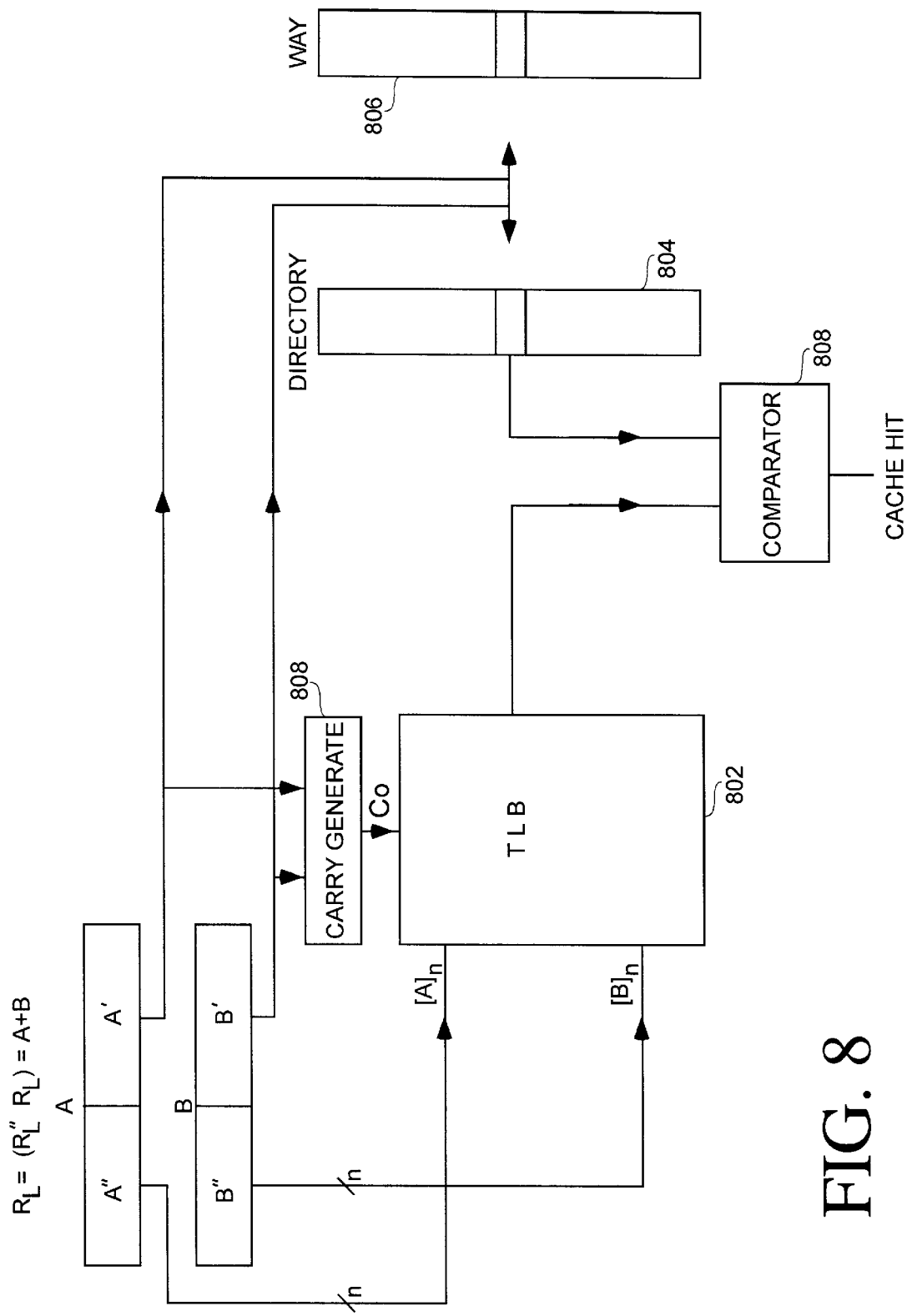
FIG. 8 illustrates a cache unit with an TLB according to an embodiment of the present invention.

A high-level functional diagram of a cache unit with the TLB of FIG. 5 is shown in FIG. 8, where for simplicity only one directory and only one way are shown. The linear address $R_L$ is partitioned as $R_L=(R''_L R'_L)$ where $R''_L$ indexes TLB 802 and $R'_L$ indexes cache directory 804 and cache way 806. As discussed previously, the bits of $R''_L$ used to index TLB 802 may be the highest-order n bits of $R_L$, i.e., $[R_L]_n$, where n is less than or equal to the number of bits in $R''_L$. Operands A and B are partitioned as A=(A"A') and B=(B"B'), and have the same partitioning as $R_L$. That is, the bit positions of A defining its partitioning and the bit positions of B defining its partitioning are the same bit positions that define the partitioning of $A_L$. In general, $[A]_n$ and $[B]_n$ are proper subsets, respectively, of A" and B" if n is less than the number of bits in $R''_L$ (or equivalently A" or B").

Carry generate unit 808 provides the carry-out term $c_0$ for the sum of A' and B'. This carry-out term is provided to the first stage of the FACs in TLB 802 as illustrated in FIG. 7. Carry generate unit 808 may be a simple integer add unit.

Based upon $[A]_n$, $[B]_n$, and $c_0$, the FACs as described previously in reference to FIGS. 5, 6, and 7 will indicate if a tag in TLB 802 matches $[A+B]_n$. If there is a match with a tag, and provided the entry associated with the tag is valid, TLB 802 provides the translation $R''_p$ where $R_L \longleftrightarrow R_p = (R''_p R'_L)$. Comparator 808 compares $R''_p$ with the entry in directory 804 indexed by $R'_L$, and indicates a cache hit they match.

Many of the examples in the disclosed embodiments were given within the context of the two-level hierarchical virtual memory mapping scheme of FIG. 1. However, the present invention is not limited to such a scheme, so that other virtual memory schemes may be employed.

Various modifications may be made to the above-described embodiments without departing from the scope of the invention as claimed below. For example, many other combinations of logic gates may be employed to provide signals indicative of $z_i$. As a particular example, $\upsilon_i$ may also be expressed as $\upsilon_i=(a_i \wedge b_i) \vee (\overline{k_i} \wedge (a_i \vee b_i))$, so that an exclusive OR is not needed to compute $\upsilon_i$. The logic gates may be realized, for example, by static or dynamic CMOS (Complementary Metal Oxide Semiconductor) circuits.

We claim:

1. A content addressable memory comprising:
   a first input port to receive a signal indicative of $[A]_n=(a_n, a_{n-1}, \ldots, a_1)$, where $(a_n, a_{n-1}, \ldots, a_1)$ are n bits of an operand A;
   a second input port to receive a signal indicative of $[B]_n=(b_n, b_{n-1}, \ldots, b_1)$, where $(b_n, b_{n-1}, \ldots, b_1)$ are n bits of an operand B. where for $i=1\ldots n$, $b_i$ has the same bit position in B that $a_i$ has in A; wherein $[A]_n$ and $[B]_n$ do not include the first bits, respectively, of A and B;
   memory cells to store a tag $K_n=(k_n, k_{n-1}, \ldots, k_1)$; and
   a fast adder-comparator to provide a word line signal indicative of whether $[A+B]_n=K_n$, where $[A+B]_n=(r_n, r_{n-1}, \ldots, r_1)$, where $(r_n, r_{n-1}, \ldots, r_1)$ are n bits of (A+B), where for $i=1\ldots n$, $r_i$ has the same bit position in (A+B) that $a_i$ and $b_i$ have in A and B, respectively.

2. The content addressable memory as set forth in claim 1, where A and B have the same number of bits N, wherein $(a_n, a_{n-1}, \ldots, a_1)$ and $(b_n, b_{n-1}, \ldots, b_1)$ are the n highest-order bits of A and B, respectively, where n<N.

3. The content addressable memory as set forth in claim 1, wherein for $i=2, \ldots, n$, fast adder-comparator provides signals indicative of $z_i$, where $z_i=\overline{\upsilon_{i-1}\oplus p_i \oplus k_i}$; where for $i=1,2,\ldots,n$, $\upsilon_i=(p_i \wedge \overline{k_i}) \vee g_i$, $p_i=a_i \oplus b_i$, and $g_i=a_i \wedge b_i$.

4. The content addressable memory as set forth in claim 3, wherein the fast adder-comparator provides a signal indicative of $z_1=\overline{\upsilon_0 \oplus p_i \oplus k_i}$, where $\upsilon_0$ is the carry-out term for the sum (A+B) in the bit position immediately prior to the bit position of $a_1$ in A.

5. The content addressable memory as set forth in claim 4, wherein the word line signal is indicative of $Z_n=z_n \wedge z_{n-1} \wedge \cdots \wedge z_1$.

6. A translation look-aside buffer comprising:
   a first input port to receive a signal indicative of $[A]_n=(a_n, a_{n-1}, \ldots, a_1)$ where $(a_n, a_{n-1}, \ldots, a_1)$ are the n highest-order bits of an operand A having N bits where n<N;
   a second input port to receive a signal indicative of $[B]_n=(b_n, b_{n-1}, \ldots, b_1)$, where $(b_n, b_{n-1}, \ldots, b_1)$ are the n highest-order bits of an operand B having N bits;
   memory cells to store a tag $K_n=(k_n, k_{n-1}, \ldots, k_1)$; and
   a fast adder-comparator to provide a word line signal indicative of whether $[A+B]_n=K_n$, where $[A+B]_n=(r_n, r_{n-1}, \ldots, r_1)$, where $(r_n, r_{n-1}, \ldots, r_1)$ are the n highest-order bits of (A+B).

7. The translation look-aside buffer as set forth in claim 6, wherein for $i=2, \ldots, n$, the fast adder-comparator provides signals indicative of $z_i$, where $z_i=\overline{\upsilon_{i-1}\oplus p_i \oplus k_i}$; where for $i=1,2,\ldots,n$, $\upsilon_i=(p_i \wedge \overline{k_i}) \vee g_i$, $p_i=a_i \oplus b_i$, and $g_i=a_i \wedge b_i$.

8. The translation look-aside buffer as set forth in claim 7, wherein the fast adder-comparator provides a signal indicative of $z_1=\overline{\upsilon_0 \oplus p_1 \oplus k_1}$, where $\upsilon_0$ is the carry-out term for the sum (A'+B'), where A' and B' are the first N−n bits of A and B, respectively.

9. The translation look-aside buffer as set forth in claim 8, wherein the word line signal is indicative of $Z_n=z_n \wedge z_{n-1} \wedge \cdots \wedge z_1$.

10. The translation look-aside buffer as set forth in claim 7, wherein the fast adder comparator provides a signal indicative of $z_{1,1}=\overline{1 \oplus p_1 \oplus k_1}$ and a signal indicative of $z_{1,0}=\overline{0 \oplus p_1 \oplus k_1}$.

11. The translation look-aside buffer as set forth in claim 10, further comprising a multiplexer to provide an output signal indicative of $z_1$, where $z_1=z_{1,1}$ if the carry-out term for the sum (A'+B') is equal to $1$, and where $z_1=z_{1,0}$ if the carry-out term for the sum (A'+B') is equal to $0$, where A' and B' are the first N−n bits of A and B, respectively.

12. The translation look-aside buffer as set forth in claim 11, wherein the word line signal is indicative of $Z_n=z_n \wedge z_{n-1} \wedge \cdots \wedge z_1$.

13. A method to provide a word line signal indicative of whether a register state, denoted by $K_n=(k_n, k_{n-1}, \ldots, k_1)$, matches $(r_n, r_{n-1}, \ldots, r_1)$, where $(r_n, r_{n-1}, \ldots, r_1)$ are the n highest-order bits of (A+B), where A and B are N bit operands, where n<N, the method comprising:
   providing signals indicative of $z_i, i=2, \ldots, n$, where $z_i=\overline{\upsilon_{i-1}\oplus p_i \oplus k_i}$; where for $i=1,2,\ldots,n$, $\upsilon_i=(p_i \wedge \overline{k_i}) \vee g_i$, $p_i=a_i \oplus b_i$, and $g_i=a_i \wedge b_i$. $z_i, i=1,2,\ldots,n$, where $(a_n, a_{n-1}, \ldots, a_1)$ are the n highest-order bits of A and $(b_n, b_{n-1}, \ldots, b_1)$ are the n highest-order bits of B.

14. The method as set forth in claim 13, further comprising:
   providing a signal indicative of $z_1=\overline{\upsilon_0 \oplus p_1 \oplus k_1}$, where $\upsilon_0$ is the carry-out term for the sum (A'+B'), where A' and B' are the first N−n bits of A and B, respectively; and
   providing a signal indicative of $Z_n=z_n \wedge z_{n-1} \wedge \cdots \wedge z_1$.

15. A translation look-aside buffer comprising:
   a first input port to receive a signal indicative of n highest-order bits of an operand A having N bits where n<N;
   a second input port to receive a signal indicative of n highest-order bits of an operand B having N bits;
   memory cells to store an n-bit tag $K_n$; and
   a fast adder-comparator to provide signals indicative of bit-wise comparisons among propagator terms, conditional carry-out terms, and the n-bit tag $K_n$.

16. The translation look-aside buffer as set forth in claim 15, wherein for $i=2, \ldots, n$, fast adder-comparator provides signals indicative of $z_i$, where $z_i=\overline{\upsilon_{i-1}\oplus p_i \oplus k_i}$; where for $i=1,2,\ldots,n$, $\upsilon_i$ are the conditional carry-out terms given by $\upsilon_i=(p_i \wedge \overline{k_i}) \vee g_i$, $p_i$ are the propagator terms given by $p_i=a_i \oplus b_i$, and $g_i$ are generator terms given by $g_i=a_i \wedge b_i$, where $(a_n, a_{n-1}, \ldots, a_1)$ are the n highest-order bits of the operand A, $(b_n, b_{n-1}, \ldots, b_1)$ are the n highest-order bits of the operand B, and $K_n=(k_n, k_{n-1}, \ldots, k_1)$.

* * * * *